US009887839B2

(12) United States Patent
Fadaie et al.

(10) Patent No.: US 9,887,839 B2
(45) Date of Patent: Feb. 6, 2018

(54) SECURELY SHARING INFORMATION VIA A PUBLIC KEY-VALUE DATA STORE

(71) Applicant: BitTorrent, Inc., San Francisco, CA (US)

(72) Inventors: Farid Fadaie, San Francisco, CA (US); Lars Arvid Norberg, San Francisco, CA (US)

(73) Assignee: Rainberry, Inc., San Francisco, CA (US)

( * ) Notice: Subject to any disclaimer, the term of this patent is extended or adjusted under 35 U.S.C. 154(b) by 6 days.

(21) Appl. No.: 14/732,490

(22) Filed: Jun. 5, 2015

(65) Prior Publication Data
US 2015/0358158 A1 Dec. 10, 2015

Related U.S. Application Data

(60) Provisional application No. 62/009,079, filed on Jun. 6, 2014.

(51) Int. Cl.
*H04L 9/32* (2006.01)
*H04L 9/08* (2006.01)
(Continued)

(52) U.S. Cl.
CPC .......... *H04L 9/0838* (2013.01); *H04L 9/0841* (2013.01); *H04L 9/0894* (2013.01); *H04L 63/061* (2013.01); *H04L 67/104* (2013.01)

(58) Field of Classification Search
CPC ....... H04L 9/08; H04L 9/0844; H04L 63/061; H04L 9/0838
(Continued)

(56) References Cited

U.S. PATENT DOCUMENTS 6,052,466 A * 4/2000 Wright ................. H04L 9/0861
380/262
6,516,412 B2 * 2/2003 Wasilewski ...... H04N 21/63345
348/E5.004
(Continued)

FOREIGN PATENT DOCUMENTS

WO    WO 06/000802 A2    1/2006

OTHER PUBLICATIONS

WO 2006/000802 A2 "Improvements relating to secure telecommuncations", Jan. 5, 2006, Morris et al., Amteus Ltd.*
(Continued)

*Primary Examiner* — Oleg Korsak
*Assistant Examiner* — Peiliang Pan
(74) *Attorney, Agent, or Firm* — Fenwick & West LLP

(57) ABSTRACT

In some embodiments, each client device in the network has a private key and a public key. For two client devices to securely exchange information, each computes a shared secret based on its own private key and the other's public key. The client devices use the shared secret to generate a shared secret key pair. The shared secret public key is used as a key by each client device to store data in a public key-value data store to share with the other client device. The shared data is signed using the shared secret key pair. The shared data may also be encrypted using the shared secret key pair. Each client device uses the shared secret public key to retrieve the data from the public key-value data store. Each client device uses the shared secret key pair to verify and decrypt the shared data.

20 Claims, 4 Drawing Sheets

(51) Int. Cl.
*H04L 29/06* (2006.01)
*H04L 29/08* (2006.01)
(58) Field of Classification Search
USPC .................................................. 713/170, 171
See application file for complete search history.

(56) References Cited

U.S. PATENT DOCUMENTS

| | | | |
|---|---|---|---|
| 2002/0144118 A1* | 10/2002 | Maruyama | H04L 63/045 |
| | | | 713/170 |
| 2005/0232428 A1* | 10/2005 | Little | H04L 9/0841 |
| | | | 380/277 |
| 2006/0153364 A1* | 7/2006 | Beeson | H04L 9/3066 |
| | | | 380/30 |
| 2007/0223706 A1 | 9/2007 | Gantman et al. | |
| 2009/0103726 A1* | 4/2009 | Ahmed | H04L 9/0668 |
| | | | 380/46 |
| 2011/0208970 A1* | 8/2011 | Brown | H04L 9/0844 |
| | | | 713/176 |
| 2012/0039474 A1* | 2/2012 | Ho | H04L 9/0844 |
| | | | 380/278 |
| 2012/0089519 A1 | 4/2012 | Peddada | |
| 2015/0200774 A1* | 7/2015 | Le Saint | H04L 9/0844 |
| | | | 713/171 |

OTHER PUBLICATIONS

PCT International Search Report and Written Opinion, PCT Application No. PCT/US15/34565, Sep. 14, 2015, 17 pages.

* cited by examiner

SECURELY SHARING INFORMATION VIA A PUBLIC KEY-VALUE DATA STORE

CROSS REFERENCE TO RELATED APPLICATIONS

This application claims the benefit of U.S. Provisional Application No. 62/009,079, filed Jun. 6, 2014, which is incorporated by reference in its entirety.

BACKGROUND

1. Field of Art

The present embodiments generally relates to the sharing of information and more specifically to securely sharing information via a public key-value data store.

2. Background

Users of client devices (e.g., mobile phones, tablets, and desktops) are able to send and receive communications and data using various communications protocols and associated software applications. Some of these communications protocols provide enhanced security features. For example, some may provide end-to-end encryption between the client devices engaging in the communications. Others may not require that the user provide a significant amount of personally identifiable information.

A common aspect of current communications protocols is that they typically need to use a centralized server or cluster of servers (e.g., a cloud) in order to facilitate communications between two parties. The centralized server is typically involved in performing handshake and maintenance activities between client devices using the communications protocol. The centralized server may also assist users in searching for other users as well as transfer messages between client devices. Without a centralized server, the client devices executing the communications protocol may not be able to easily find each other and send data to each other.

However, with a centralized server, there is typically a need to keep at least some record of communications between client devices. Although the actual contents of the communications (e.g., text message, image file, voice records) may not be stored, metadata regarding communications (e.g., IP addresses, timestamps), which may be required for the communications protocol to properly function, need to be logged and stored. By mining this metadata, one may be able to create a detailed record of the communications of an individual user, and in turn, may be able to discover things about the user that the user did not intend others to find out.

SUMMARY

The above and other issues are addressed by a method, computer-readable storage medium, and computer system for exchanging information via a public key-value data store.

In some embodiments, each client device in the network has a persistent key pair that includes a private key and a public key. For two client devices to securely exchange information, each client device obtains the other client device's public key. Each client device computes a shared secret based on its own private key and the other client's public key. Both client devices obtain the same shared secret which is unique to the two client devices. In some embodiments, the shared secret is computed using a Diffie-Hellman key exchange.

The client devices use the resulting shared secret to generate a shared secret key pair that includes a shared secret public key and a shared secret private key. The shared secret public key is used as a key to store information in a public key-value data store. The public key-value data store is a storage system that stores information under different keys and is publicly accessible by multiple client devices. In one embodiment, the public key-value data store is a decentralized distributed storage system, such as a distributed hash table (DHT). In another embodiment, the key-value data store is a centralized storage, such as a server.

Using the shared secret public key, each of the two client devices stores shared data in the public key-value data store that the user of the client device wishes to share with the user of the other client device. The shared data is signed using the shared secret key pair. The shared data may also be encrypted using the shared secret key pair. When one of the client devices wishes to retrieve the data shared by the other device, the client device uses the shared secret public key to retrieve the data from the public key-value data store. The client device uses the shared secret public key to verify the digital signature of the shared data and may use the shared secret private key to decrypt the data.

In one embodiment, the data shared by each client device through public key-value data store includes status information and/or contact information of that client device. Status information is an indication as to whether the client device is online (i.e., currently available to communicate). Contact information is information that can be used to establish a connection between two client devices for communication. The contact information may include, for example, the public IP address of the client device, internal IP address of the client device (e.g., if the client device is on a local network), a relay server token (e.g., if the client device is behind a network address translation (NAT)), and a unique identifier of the client device.

The client devices use the shared data stored in the public key-value data store under the shared secret public key to communicate with each other. For example, a first client device can retrieve the shared data stored by a second client device under the shared secret public key in the public key-value data store and determine whether the second client device is online. If the second client device is online, the first client device can use the second client device's contact information stored under the shared secret public key to establish a connection between the two client devices to communicate with the second client device.

If at any point one of the client devices no longer wishes for the other client device to be able to communicate with it, the client device can stop storing its information under the shared secret public key in the public key-value data store. By not sharing its information with the other client device in the public key-value data store, the other client device will not be able to communicate with it.

In one embodiment, when a client device leaves the network (goes offline) and rejoins the network at a later time, the rejoining client device may determine which of the client devices with which it has created shared secret key pairs are online (e.g., determines which friends are online). To make such a determination, for each shared secret key pair that it has created with another client device, the rejoining client device may recreate the shared secret key pair (shared secret public key and private key) using the other client device's persistent public key. The rejoining client device checks under the shared secret public key in the public key-value data store for the shared data stored by other client device. Based on the shared data, the rejoining client device determines whether the other client device is online. The information obtained by the rejoining client device as to which client devices are online can be presented to a user of the rejoining client device. If the user requests to communicate with an online client device, the rejoining client device can access the appropriate contact information from the shared data in the public key-value store for communicating with the online client device. In one embodiment, while online, a client device periodically determines which other client devices are online, and may do this by accessing the shared data in the public key-value data store.

Although the public key-value data store is publicly accessible by other client devices, the data shared between two client devices is safe because a third client device will not know which shared secret public key is being used by the two client devices to share the data. Even if the third client device is able to obtain the shared secret public key, the third client device will not be able to deduce the real identity of the client devices that stored the shared data under the public key. Further, if the information is encrypted using the shared secret key pair unique to the two client devices, the third client device would not be able to decrypt the shared data. Additionally, two client devices with shared data in the key-value store under a key can be certain that the shared data stored is valid and authentic because of the shared secret key pair used to sign the shared data. Only the two client devices have access to the shared secret private key needed to produce a valid signature. Therefore, the client devices are able to use the public key-value data store to securely store information.

DETAILED DESCRIPTION

Figure 1:
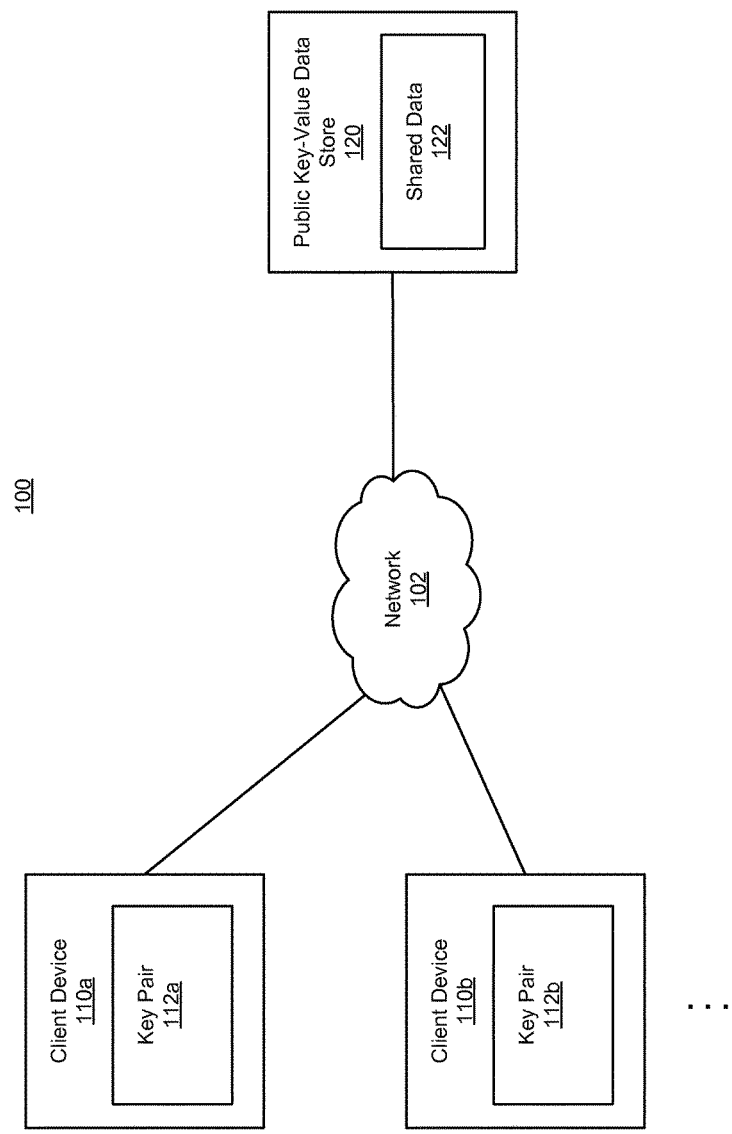
FIG. 1 is a high-level block diagram illustrating an environment for securely sharing data via a public key-value data store according to one embodiment.

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. The figures use like reference numerals to identify like elements. A letter after a reference numeral, such as "110a," indicates that the text refers specifically to the element having that particular reference numeral. A reference numeral in the text without a following letter, such as "110," refers to any or all of the elements in the figures bearing that reference numeral.

FIG. 1 is a high-level block diagram illustrating an environment 100 for securely sharing data via a public key-value data store according to one embodiment. As shown, the environment 100 includes the client devices 110a and 110b and a public key-value data store 120 connected through a network 102. Only two client devices 110 and one public key-value data store 120 are illustrated in FIG. 1 in order to simplify and clarify the present description. However, embodiments can have millions of client devices 110 and multiple public key-value data stores 120. There can be other entities in the environment 100 as well.

The network 102 enables communications between each client device 110 and the public key-value data store 120. In one embodiment, the network 102 uses standard communications technologies and/or protocols and can include the Internet as well as mobile telephone networks. Thus, the network 102 can include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 102 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 102 can be represented using technologies and/or formats including image data in binary form (e.g. Portable Network Graphics (PNG)), the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities on the network 102 can use custom and/or dedicated data communications technologies instead of, or in addition to, the ones described above.

The public key-value data store 120 is a data store that is used to store data (shared data 122) shared between different entities such as client devices. Shared data 122 is stored and retrieved from the public key-value data store using a key. The public key-value data store 120 may be structured in various different formats, such as a lookup table, a hash table, tree, graph, or relational database. It may reside at a centralized location on one or more computing devices (e.g., server end stations).

In some embodiments, the public key-value data store 120 is decentralized among many nodes in a distributed network, such as a peer-to-peer network. In such a case, the public key-value data store 120 may take the form of a distributed hash table. In a distributed hash table, the values (e.g., the data) are searched by executing a hash function against the key and using the result as an index on the value. The hash function is designed such that the lookup costs for each value in the hash table stays relatively consistent regardless of the number of items being stored in the table. Furthermore, as the hash table is distributed, it is split into multiple chunks that may be duplicated among the many nodes in the distributed network such that each node may store a copy of a portion of the hash table. Each node may also link to other nodes and know the key value ranges that the other connected nodes store. Nodes may be connected to those other nodes that have keys that are close in "distance" to their own keys based on a formula that calculates the "distance" between two keys.

In some embodiments, two client devices 110 exchange public keys and subsequently generate a unique shared secret key pair to communicate shared data 122 with each other. The public key of the shared secret key pair is used as the key value in the public key-value data store 120. The shared data 122 is then stored as the value associated with that key. For ease of understanding, client device 110a and client device 110b are assumed to share data with each other for the purposes of this description. Although a particular client device 110a or 110b will be referred to in the description, it should be noted that they may be used interchangeably with each other.

The shared data 122 may include contact information, status information, and/or other data. Contact information may include but is not limited to the Internet Protocol (IP) addresses of one or both of the client devices 110, a relay server token in the case where one or both of the client devices 110 are behind a firewall or cannot be directly routed to (e.g., behind a router performing network address translation), a unique identifier, port numbers, and an authentication token. Contact information may be used to establish a connection between two client devices 110. For example, contact information may be used by the client device 110a to determine the IP address of client device 110b and establish a connection with client device 110b. Status information may include information about the status of each of the client devices 110, such as whether the client device 110 is online, offline, away, and busy. Other data may include offline messages, voice messages, images, videos, and additional data that one client device 110a sends to the other client device 110b. This data may be data that the user of one of the client devices 110 wishes to send to the user of the paired client device 110.

In some embodiments, the shared data 122 is also encrypted using the shared secret key pair between the two client devices 110, preventing third parties from reading the shared data 122. Shared data 122 may also be digitally signed using the shared secret key pair in order to be able to determine if the data 122 has be altered by an unauthorized entity.

In some embodiments, the data (both keys and values) in the public key-value data store 120 is periodically purged or cleaned. The determination for which data items are purged may be based upon time since last modification, time since last access, size of data, remaining storage, and other factors. In addition, the public key-value data store 120 may receive a request from one of the client devices 110 to purge the data for a particular key. The public key-value data store 120 may request authentication before such a request is granted.

The client devices 110 are electronic devices that can be used by users to exchange information in the environment 100. In one embodiment, client devices 110 can be used to send or receive private communications. These communications may include telephone calls, video calls, data messages between telephone numbers, instant messages, emails, and other forms of data or voice communication. Examples of client devices 110 include desktop computers, smartphones, portable digital assistants (PDAs), notebooks, and tablet computers. Although the client devices 110a and 110b are referred to specifically in this description, it should be understood that other client devices 110 in network 102 may perform the same functions as the client devices 110a and 110b.

In some embodiments, the client devices 110a and 110b are each associated with a public and private key pair 112a and 112b respectively. In some embodiments, the client devices 110 associate a more user-friendly piece of contact information (e.g., email address or phone number) with their public key 112. This association may be stored by a directory service or a database. In some embodiments, a key pair 112 is unique to each user and a user may be able to migrate or copy his or her key pair 112 to different client devices.

Although a key pair 112 can be unique to a user rather than a client device, for ease of understanding, a key pair 112 will be referred to as being associated with a client device 110 and not a user in this description. A key pair 112 may be also be referred to a user key pair or a client key pair.

A user of one client device 110a may wish to have a private communication with the user of another client device 110b. To do this, in some embodiments, the client device 110a identifies the client device's 110b public key of the key pair 112b. In one embodiment, the client device 110a obtains the public key by searching the directory service or the database for the user-friendly contact information in order to find the public key for the client device 110b. In other embodiments, the public keys for each client device 110 are exchanged without using a directory service (e.g., offline or through another communications channel). Subsequently, using the private key of the client device 110a and the public key of the client device 110b, the client device 110a is able to generate a shared secret using a key exchange protocol. The client device 110b uses the same key exchange protocol with its own private key and the public key of the client device 110a to generate the same shared key pair.

Using the shared secret as a seed, the client device 110a generates a shared secret key pair. It then uses the shared secret public key of the shared secret key pair as a key for the public key-value data store 120 to store the shared data 122 for the other client device 110b. The shared data 122 is signed and may also be encrypted with the shared secret key pair. The client device 110b may then be able to retrieve this shared data 122 from the public key-value data store 120 and determine how to contact the client device 110a, to read any offline messages, or to retrieve any other data. The client device 110b is able to verify the authenticity of the shared data 122 (and decrypt the shared data 122) as it has also generated the same shared secret key pair.

Since each shared data 122 value is associated with a unique shared secret public key and that shared secret public key is not linked with each client device 110, a third party cannot easily track which client device 100 is part of which communications. Furthermore, as only the client devices 110 that are part of the communications can sign and decrypt the shared data 122, the shared data 122 between the client devices can be verified to be authentic. Additionally, as the public key-value store does not need to be stored in a centralized location, there is much less of a data trail that can be exploited by a third party to determine unwanted information about different client devices.

Figure 2:
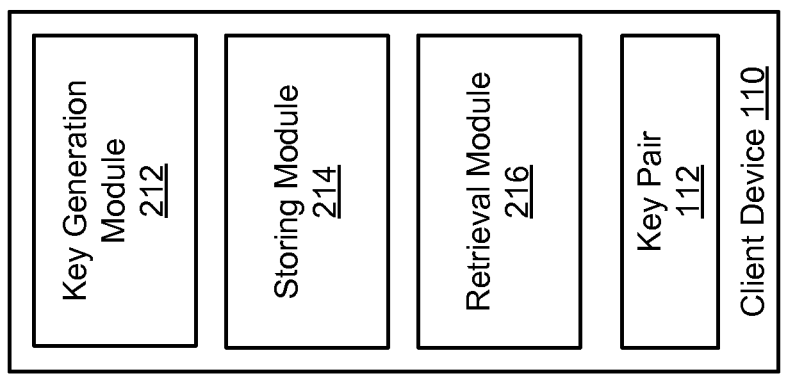
FIG. 2 is a high-level block diagram illustrating a detailed view of a client device according to one embodiment.

FIG. 2 is a high-level block diagram illustrating a detailed view of a client device 110 according to one embodiment. As shown in FIG. 2, the client device 110 includes multiple modules. In some embodiments, the functions are distributed among the modules in a different manner than described herein. Moreover, the functions are performed by other entities in some embodiments.

The client device 110 includes a key generation module 212. In some embodiments, the key generation module 212 generates the different keys for the client device 110 to be used for exchanging information with different client devices. The key generation module 212 may first generate the public and private key pair 112 for the client device 110. These key may be generated using well-known public key cryptography methods, such as RSA or elliptic curve cryptography.

When a user of the client device 110 wishes to share information with another client device 110, the key generation module 212 identifies the public key of the other client device 110. The key generation module 212 then takes the identified public key of the other client device 110 and the private key from the key pair 112 (its own private key) as a seed to generate a shared secret. The other client device 110 can generate the same shared secret using its own private key and the public key from the key pair 112 when using the same generation method.

This method used to generate the shared secret ensures that it is unique to the two client devices 110 that generated it. Although the public keys of each client device 110 may be visible to the public, a third party is not able to generate this shared secret without knowing the private key for the client devices 110.

In some embodiments, the generation method used is a key agreement protocol. In some embodiments, this key agreement protocol is Diffie-Hellman key exchange. When using the Diffie-Hellman key exchange method, an example of possible values to use for the Diffie-Hellman method may be to use the public keys of the client devices 110 to generate the prime number and base in the Diffie-Hellman key exchange and to generate each client device's secret integer in the Diffie-Hellman key exchange using each client device's private key. Although one method of generating the values in the Diffie-Hellman key exchange is shown here, other embodiments may generate the values using all, a portion, or none of one or more of the private and public keys of the client devices 110. In other embodiments, other key agreement protocols or methods may be used to generate the shared secret, such as MQV (Menezes-Qu-Vanstone). Note that it may be up to the users of each client device 110 to ensure that they public key they have obtained of the other client device 110 is authentic and does not instead belong to an attacker.

After the key generation module 212 generates the shared secret, it then generates a shared secret key pair that is seeded by the shared secret. The generation of the shared secret key pair may use the same or different public key cryptography method as the one used to generate the key pair 112. The key generation module 212 stores the shared secret key pair for use when sharing data with the other client device 110 or when retrieving data shared by the other client device 110. In one embodiment, the key generation module 212 includes a storage (not shown) that stores shared secret key pairs generated for sharing data with other client devices 110.

In some embodiments, the parameters (e.g., prime numbers for RSA or domain parameters for elliptic curve cryptography) inputted into the public key cryptography method used to generate the shared secret key pair is seeded or modified by a portion or all of the shared secret value. This allows the two client devices 110*a* and 110*b* to generate the same shared secret key pair.

The storing module 214 stores the shared data 122 in the public key-value data store 120 for other client devices 110 to retrieve the shared data 122. When the user of the client device 110 requests to share data with another client device 110, the storing module 214 identifies the shared secret public key created by the key generation module 212 for the other client device 110. The storing module 214 stores the shared data 122 in the public key-value data store 120 using the shared secret public key as the key. The shared data 122 may include contact information, status information, and other data as described previously. This shared data 122 may then be retrieved by the other client device 110 that has also generated the same shared secret public key using the same shared secret.

In some embodiments, the storing module 214 signs the shared data 122 that it stores in the public key value-data store 120 using the shared secret key pair. This allows the other client device 110 that retrieves the shared data 122 to verify the authenticity of the data. For example, the storing module 214 may sign the shared data 122 using the shared secret private key, and the other client device 110 would be able to verify the signature using the shared secret public key. Since no other client devices 110 have the shared secret private key, the authenticity of the data is verified.

In some embodiments, the storing module 214 also encrypts the shared data 122 that it stores in the public key-value data store 120 using the shared secret key pair. The data may be encrypted using the shared secret public key, such that the data can only be decrypted by the shared secret private key (which the other client device 110 has). The data may also be encrypted using the shared secret private key so that the encrypted data can only be decrypted by the shared secret private key. This encryption allows the shared data 122 between two client devices 110 to be private and not readable by any third party. For example, if the client device 110 stores encrypted contact information as shared data 122, only the other client device can decrypt and read this information.

In some embodiments, the storing module 214 periodically stores contact information and/or status information in the public key-value data store 120 using the shared secret public key shared with the other client device. The information is periodically stored so that the other client device 110 can continuously establish a connection with the client device 110. However, if the user of the client device 110 no longer wishes for the other client device 110 to be able to communicate with it, the storing module 214 ceases storing shared data 122 under the shared secret public key shared with the other device 110.

In some embodiments, client devices 110 may initiate a group conversation. In such a case, each client device 110 may generate a shared secret key pair with each other client device 110 in the group, and a client device 110 may broadcast any shared data 122 to all the client devices 110 in the group.

The retrieval module 216 retrieves shared data 122 from the public key-value data store 120. When the user of the client device 110 requests to retrieve shared data 122 shared by another client device 110 through the public key-value data store 120, the storing module 214 identifies the shared secret public key created by the key generation module 212 and shared with the other client device 110. The retrieval module 216 uses the shared secret public key to retrieve the shared data 122 from the public key-value data store 120.

In one embodiment, the retrieved shared data 122 is contact information of the other client device 110. The retrieval module 216 attempts to establish a connection with the other client device 110 (e.g., a peer-to-peer connection). If the retrieval module 216 is able to establish the connection with the other client device 110, the user can then exchange communications with the other client device 110 via the connection. Hence, after establishing the connection, the two client devices 110 can communicate with each other directly without having to communicate through the public key-value data store 120. In this embodiment, the public key-value data store 120 is only used to establish the connection.

In some embodiments, after the client device 110 returns from being offline (e.g., connects to the network 102 after not being connected to the network 102), for each shared secret public key created with another client device 110, the retrieval module 216 checks the public key-value data store 120 for shared data 122 stored under the shared secret public key. In one embodiment, if the shared data 122 includes contact information, the retrieval module 216 attempts to establish a connection with the other client device 110. In one embodiment, if the shared data 122 includes status information, the retrieval module 216 displays to the user in a user interface a status indicated by the status information. In some embodiments, when client device 110 return from being offline, the key generation module 212 regenerates each shared secret public key using the public key of each of the other client devices 110.

In some embodiments, for each shared secret public key created, the retrieval module 216 periodically checks the public key-value data store 120 for changes in shared data 122. For example, the retrieval module 216 may check whether status or contact information for another client device 110 has changed.

Figure 3:
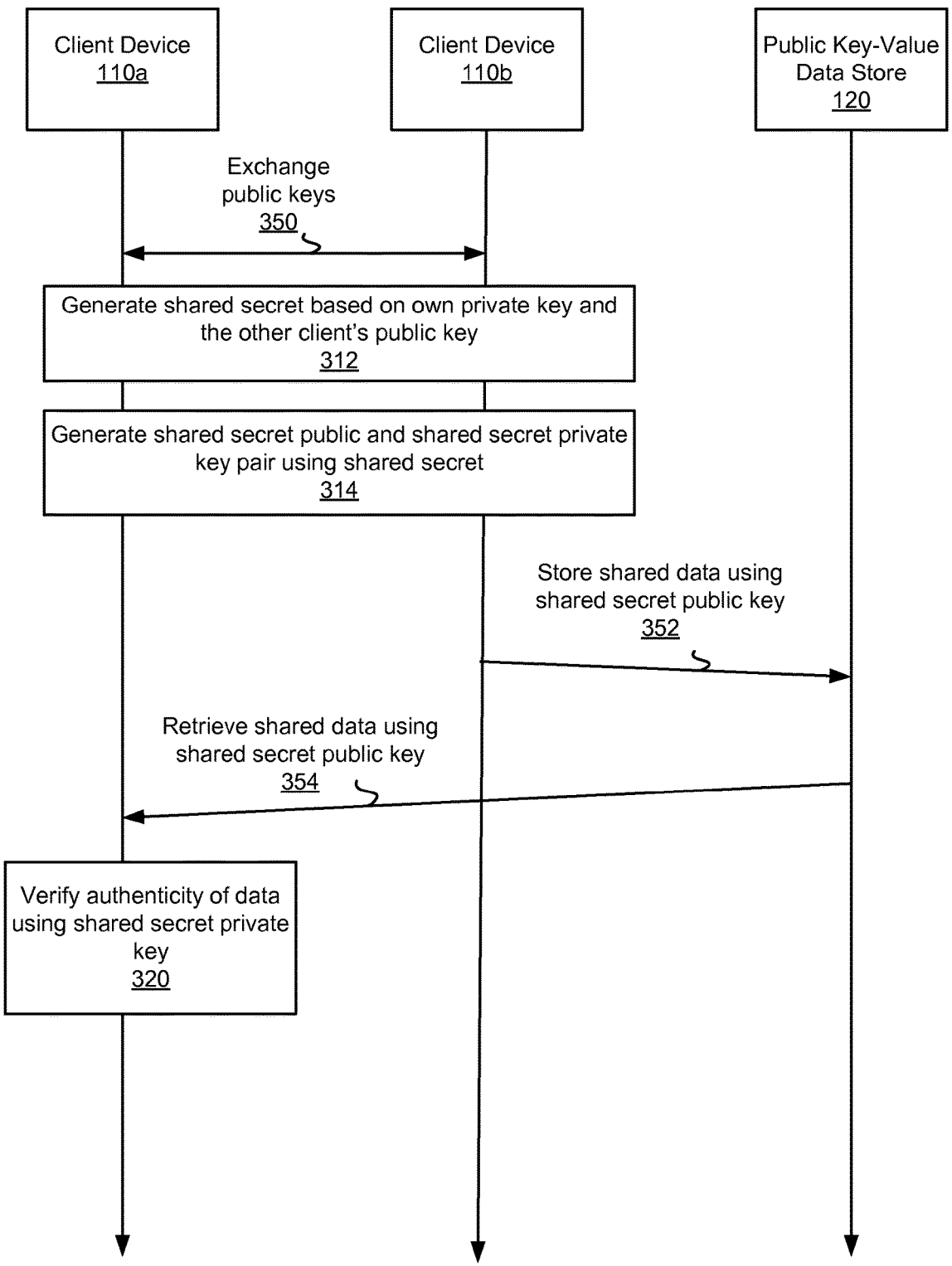
FIG. 3 is an interaction diagram illustrating the sharing of data via a public key-value data store according to one embodiment.

FIG. 3 is an interaction diagram illustrating the sharing of data via a public key-value data store according to one embodiment. The interaction diagram illustrates the steps performed by client device 110a, client device 110b, and the public key-value data store 120. Those of skill in the art will recognize that other embodiments can perform the steps described for FIG. 3 in different orders. Moreover, other embodiments can include different and/or additional steps than the ones described.

Assume for purposes of this example that client device 110a has its own key pair that includes a private key and a public key. Additionally, assume that client device 110b has its own key pair that includes a private key and a public key. Client device 110a and the client device 110b exchange 350 public keys. Subsequently, client device 110a and the client device 110b each generates 312 the shared secret based on its own private key and the other client device's public key. As noted previously, this shared secret is unique to these two client devices 110.

Using the shared secret, the client device 110a and the client device 110b each generate 314 the shared secret public key and the shared secret private key. The shared secret key pair is comprised of the shared secret public key and the shared secret private key. The client device 110b stores 352 shared data 122 in the public key-value data store 120 using the shared secret public key as the key. The shared data 122 may include contact information, status information, or other data as described previously.

The client device 110a retrieves 354 the shared data 122 from the public key-value data store 120 using the shared secret public key. After the client device 110a retrieves the shared data 122, it verifies 320 the authenticity of the shared data 122 confirming that the other client device 110b had stored that shared data 122. The verification is done using the shared secret private key.

In some embodiments, the client device 110a also stores shared data 122 in the public key-value data store 120 using the shared secret public key. The data may be stored in response to the shared data 122 stored by the client device 110b.

Figure 4:
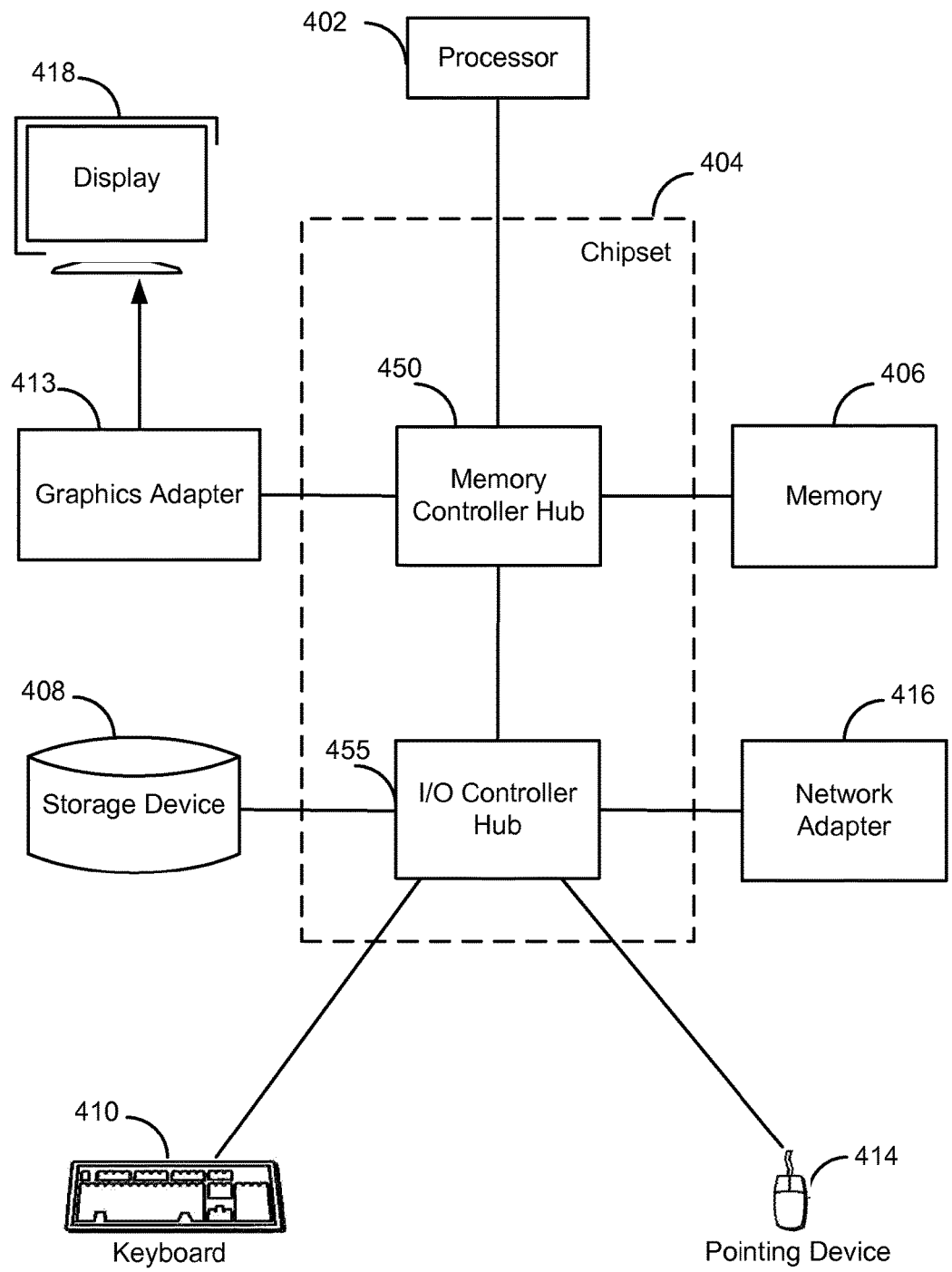
FIG. 4 is a high-level block diagram illustrating an example of a computer for use as a component in the client device or the public key-value data store, in accordance with one embodiment.

FIG. 4 is a high-level block diagram illustrating an example of a computer 400 for use as a component in the client device 110 or the public key-value data store 120, in accordance with one embodiment. Illustrated are at least one processor 402 coupled to a chipset 404. The chipset 404 includes a memory controller hub 450 and an input/output (I/O) controller hub 455. A memory 406 and a graphics adapter 413 are coupled to the memory controller hub 450, and a display device 418 is coupled to the graphics adapter 413. A storage device 408, keyboard 410, pointing device 414, and network adapter 416 may be coupled to the I/O controller hub 455. Other embodiments of the computer 400 have different architectures. For example, the memory 406 is directly coupled to the processor 402 in some embodiments. As another example, some embodiments of the computer 400 may have different I/O devices, such as a touchscreen, camera, gyroscope, etc.

The storage device 408 is a non-transitory computer-readable storage medium such as a hard drive, compact disk read-only memory (CD-ROM), DVD, or a solid-state memory device. The memory 406 holds instructions and data used by the processor 402. The pointing device 414 is used in combination with the keyboard 410 to input data into the computer system 400. The graphics adapter 413 displays images and other information on the display device 418. In some embodiments, the display device 418 includes a touch screen capability for receiving user input and selections. The network adapter 416 couples the computer system 400 to the network 102. Some embodiments of the computer 400 have different and/or other components than those shown in FIG. 4. For example, the public key-value data store 120 can be formed of multiple blade servers and lack a display device, keyboard, and other components.

The computer 400 is adapted to execute computer program modules for providing functionality described herein. As used herein, the term "module" refers to computer program instructions and other logic used to provide the specified functionality. Thus, a module can be implemented in hardware, firmware, and/or software. In one embodiment, program modules formed of executable computer program instructions are stored on the storage device 408, loaded into the memory 406, and executed by the processor 402.

Upon reading this disclosure, those of skill in the art will appreciate that additional alternative structural and functional designs are possible. Thus, while particular embodiments and applications have been illustrated and described, it is to be understood that the present embodiments are not limited to the precise construction and components disclosed herein and that various modifications, changes and variations which will be apparent to those skilled in the art may be made in the arrangement, operation and details of the method and apparatus disclosed herein without departing from the spirit and scope as defined in the appended claims.

The invention claimed is:

1. A computer-implemented method for sharing information:
    storing, by a first client device, a first private key and a first public key associated with the first client device;
    identifying, by the first client device, a second public key associated with a second client device;
    generating, by the first client device, a shared secret based on the first private key and the second public key using a key exchange protocol;
    generating, by the first client device, a first shared secret public key using the shared secret;
    storing, by the first client device, shared data in an entry in a public key-value data store, the shared data being the value of the entry and the first shared secret public key being a key for the entry; and
    establishing, by the first client device, a connection with the second client device based on the second client device retrieving the shared data from the public key-value data store, the shared data retrieved by the second client using a second shared secret public key that is the same as the first shared secret public key, the second shared secret public key generated by the second client device using the first public key and a second private key associated with the second client device.

2. The method of claim 1, wherein the key exchange protocol is a Diffie-Hellman key exchange.

3. The method of claim 1, further comprising:
digitally signing the shared data prior to storing the shared data in the public-key value data store, the signing verified by the second client device using the second shared secret public key.

4. The method of claim 1, wherein a first shared secret private key is associated with the first shared secret public key and is generated using the shared secret, the method further comprising:
encrypting the shared data using the first shared secret private key prior to storing the shared data in the public-key value data store, the shared data decrypted by the second client device using the second shared secret private key.

5. The method of claim 1, wherein a second shared secret private key is associated with the second shared secret public key, the method further comprising:
encrypting the shared data using the first shared secret public key prior to storing the shared data in the public-key value data store, the shared data decrypted by the second client device using the second shared secret private key.

6. The method of claim 1, further comprising:
monitoring the public-key value data store for changes in data associated with the first shared secret public key.

7. A computer-implemented method for sharing information, comprising:
storing, by first client device, a first private key associated with the first client device;
generating, by the first client device, a first shared secret public key based on the first private key and a second public key received from a second client device; and
establishing, by the first client device, a connection with the second client device by storing shared data in an entry in a public key-value data store, the shared data being a value of the entry and the first shared secret public key being a key of the entry, the shared data stored in the public key-value data store accessed by the second client device via a second shared secret public key.

8. The method of claim 7, wherein the second shared secret public key generated by the second client device using a first public key associated with the first client device and a second public key associated with the second client device, and wherein the second shared secret public key is the same as the first shared secret public key.

9. The method of claim 7, wherein generating the first shared secret public key comprises:
generating, by the first client device, a shared secret based on the first private key and the second public key using a key exchange protocol; and
generating, by the first client device, the first shared secret public key using the shared secret.

10. The method of claim 9, wherein the key exchange protocol is a Diffie-Hellman key exchange.

11. The method of claim 7, where the shared data is status information indicating whether the first client device is online.

12. The method of claim 7, where the shared data is connection information used to establish a connection with the first client device.

13. The method of claim 7, further comprising:
digitally signing the shared data prior to storing the shared data in the public key-value data store, the signing verified by the second client device using the second shared secret public key.

14. The method of claim 7, wherein a first shared secret private key is associated with the first shared secret public key, the method further comprising:
encrypting the shared data using the first shared secret private key prior to storing the shared data in the public key-value data store, the shared data decrypted by the second client device using the second shared secret public key.

15. The method of claim 7, wherein a second shared secret private key is associated with the second shared secret public key, the method further comprising:
encrypting the shared data using the first shared secret public key prior to storing the shared data in the public key-value data store, the shared data decrypted by the second client device using the second shared secret private key.

16. The method of claim 7, further comprising:
monitoring the public key-value data store for changes in data associated with the first shared secret public key.

17. A non-transitory computer-readable storage medium storing executable computer program instructions for sharing information, the computer program instructions comprising instructions for:
storing, by first client device, a first private key associated with the first client device;
generating, by the first client device, a first shared secret public key based on the first private key and a second public key received from a second client device; and
establishing, by the first client device, a connection with the second client device by storing shared data in an entry in a public key-value data store, the shared data being a value of the entry and the first shared secret public key being a key of the entry, the shared data stored in the public key-value data store accessed by the second client device via a second shared secret public key.

18. The non-transitory computer-readable storage medium of claim 17, wherein the second client device retrieves the data from the public key-value data store using the second shared secret public key, the second shared secret public key generated by the second client device using a first public key associated with the first client device and a second public key associated with the second client device.

19. The non-transitory computer-readable storage medium of claim 17, wherein generating the first shared secret public key comprises:
generating, by the first client device, a shared secret based on the first private key and the second public key using a key exchange protocol; and
generating, by the first client device, the first shared secret public key using the shared secret.

20. The non-transitory computer-readable storage medium of claim 17, the computer program instructions further comprising instructions for:
digitally signing the shared data prior to storing the shared data in the public key-value data store, the signing verified by the second client device using the second shared secret public key.

* * * * *

UNITED STATES PATENT AND TRADEMARK OFFICE
CERTIFICATE OF CORRECTION

PATENT NO. : 9,887,839 B2
APPLICATION NO. : 14/732490
DATED : February 6, 2018
INVENTOR(S) : Farid Fadaie and Lars Arvid Norberg It is certified that error appears in the above-identified patent and that said Letters Patent is hereby corrected as shown below:

In the Claims

Column 11 Claim 7, Line 31: after "by," insert -- a --

Column 12 Claim 17, Line 28: after "by," insert -- a --

Signed and Sealed this
Tenth Day of July, 2018

Andrei Iancu
*Director of the United States Patent and Trademark Office*